(12) United States Patent
Nystad et al.

(10) Patent No.: US 9,535,700 B2
(45) Date of Patent: Jan. 3, 2017

(54) DATA PROCESSING SYSTEMS

(71) Applicant: ARM Limited, Cambridge (GB)

(72) Inventors: Jorn Nystad, Trondheim (NO); Andreas Engh-Halstvedt, Trondheim (NO)

(73) Assignee: ARM LIMITED, Cambridge (GB)

( * ) Notice: Subject to any disclaimer, the term of this patent is extended or adjusted under 35 U.S.C. 154(b) by 608 days.

(21) Appl. No.: 13/918,664

(22) Filed: Jun. 14, 2013

(65) Prior Publication Data

US 2014/0372731 A1    Dec. 18, 2014

(51) Int. Cl.
*G06F 15/04*    (2006.01)
*G06F 9/38*     (2006.01)

(52) U.S. Cl.
CPC .......... *G06F 9/3802* (2013.01); *G06F 9/3851* (2013.01)

(58) Field of Classification Search
None
See application file for complete search history.

(56) References Cited

U.S. PATENT DOCUMENTS

| | | | | |
|---|---|---|---|---|
| 5,655,096 A | * | 8/1997 | Branigin | G06F 9/3836 712/200 |
| 5,717,916 A | | 2/1998 | Verma | |
| 5,809,560 A | * | 9/1998 | Schneider | G06F 12/0862 711/202 |
| 6,012,125 A | | 1/2000 | Tran | |
| 6,467,025 B1 | * | 10/2002 | Taylor | G06F 12/0864 711/118 |
| 6,594,734 B1 | | 7/2003 | Kyker et al. | |
| 6,732,238 B1 | * | 5/2004 | Evans | G06F 12/0864 365/49.1 |
| 2003/0005230 A1 | | 1/2003 | Solomon et al. | |
| 2003/0009622 A1 | * | 1/2003 | Gaskins | G06F 9/3824 711/118 |

(Continued)

FOREIGN PATENT DOCUMENTS

| | | |
|---|---|---|
| EP | 1035477 A2 | 9/2000 |
| EP | 1544737 A1 | 6/2005 |
| WO | 8909962 A1 | 10/1989 |

OTHER PUBLICATIONS

Combined Search and Examination Report dated Dec. 16, 2014 in GB Patent Application No. GB1410564.7, 8 pages.

(Continued)

*Primary Examiner* — Cheng-Yuan Tseng
(74) *Attorney, Agent, or Firm* — Vierra Magen Marcus LLP

(57) ABSTRACT

A data processing system includes an execution pipeline that includes one or more programmable execution stages which execute execution threads to execute instructions to perform data processing operations. Instructions to be executed by a group of execution threads are first fetched into an instruction cache and then read from the instruction cache for execution by the thread group. When an instruction to be executed by a thread group is present in a cache line in the instruction cache, or is to be fetched into an allocated cache line in the instruction cache, a pointer to the location of the instruction in the instruction cache is stored for the thread group. This stored pointer is then used to retrieve the instruction for execution by the thread group from the instruction cache.

19 Claims, 9 Drawing Sheets

(56) References Cited

U.S. PATENT DOCUMENTS

| | | | |
|---|---|---|---|
| 2003/0120897 A1 | 6/2003 | Schlansker | |
| 2004/0034759 A1* | 2/2004 | Katzman | G06F 9/3851 712/1 |
| 2004/0215921 A1 | 10/2004 | Alexander et al. | |
| 2006/0020772 A1 | 1/2006 | Hussain | |
| 2006/0200615 A1 | 9/2006 | Basso et al. | |
| 2009/0198969 A1* | 8/2009 | Nystad | G06F 9/383 712/216 |
| 2010/0205415 A1* | 8/2010 | Henry | G06F 9/3867 712/234 |
| 2012/0079503 A1* | 3/2012 | Dally | G06F 9/3851 718/108 |
| 2014/0223226 A1* | 8/2014 | Yigzaw | G06F 11/1064 714/15 |
| 2014/0244933 A1* | 8/2014 | Sudhakar | G06F 12/0864 711/125 |

OTHER PUBLICATIONS

Combined Search and Examination Report dated Dec. 11, 2015 in GB Patent Application No. GB1410564.7.
Examination Report dated Aug. 9, 2016, in GB Patent Application No. GB1410564.7.

* cited by examiner

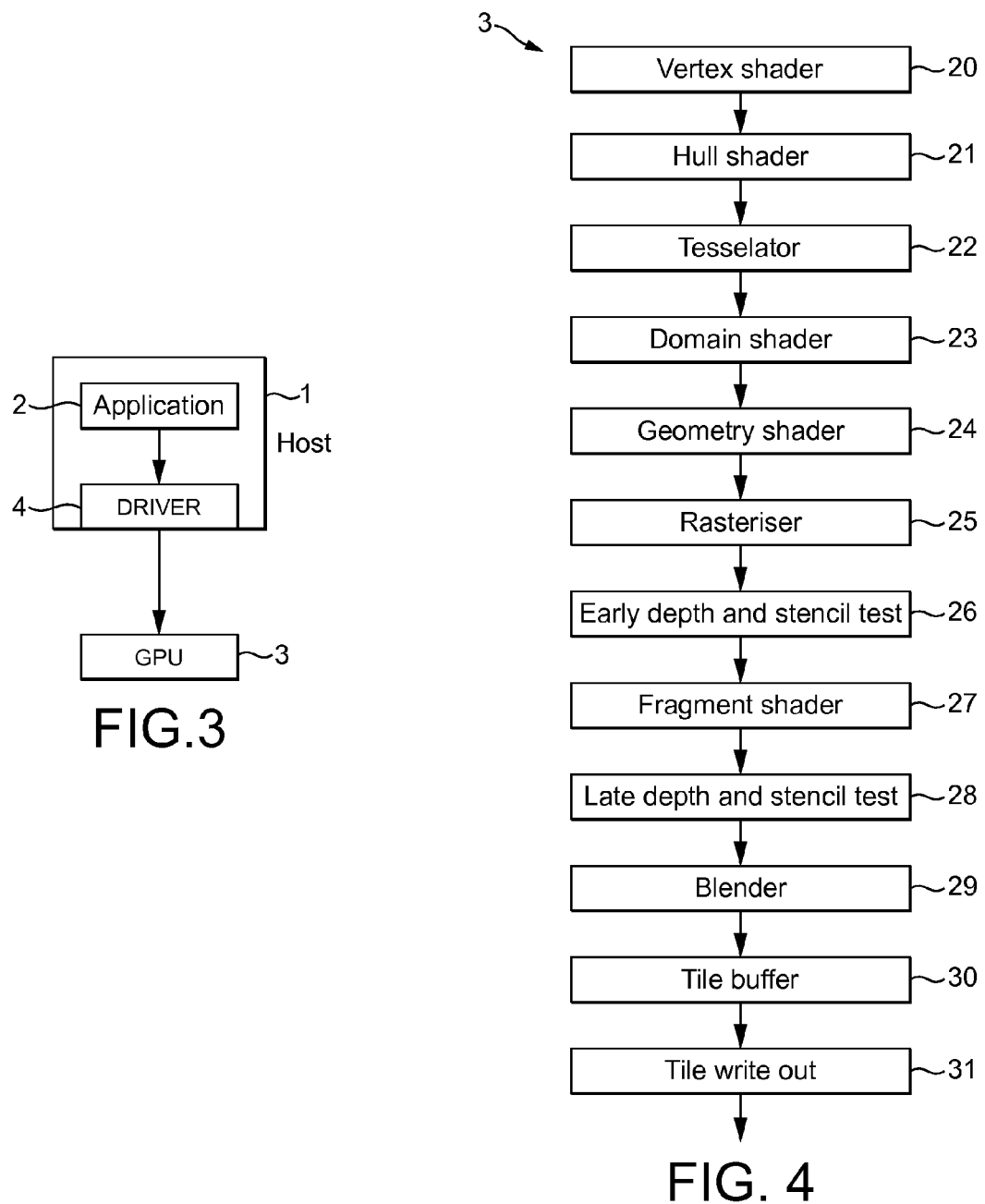

DATA PROCESSING SYSTEMS

BACKGROUND

The technology described herein relates to data processing systems, and in particular to the operation of graphics processing systems that include one or more programmable processing stages ("shaders").

As is known in the art, graphics processing is typically carried out in a pipelined fashion, with one or more pipeline stages operating on the data to generate the final render output, e.g. frame that is displayed. Many graphics processing pipelines now include one or more programmable processing stages, commonly referred to as "shaders". For example, a graphics processing pipeline may include one or more of, and typically all of, a geometry shader, a vertex shader and a fragment (pixel) shader. These shaders are programmable processing stages that execute shader programs on input data values to generate a desired set of output data (e.g. appropriately transformed and lit vertex data in the case of a vertex shader) for processing by the rest of the graphics pipeline and/or for output. The shaders of the graphics processing pipeline may share programmable processing circuitry, or they may each be distinct programmable processing units.

A graphics processing unit (GPU) shader core is thus a processing unit that performs graphics processing by running small programs for each graphics item in a graphics output to be generated such as a render target, e.g. frame (an "item" in this regard is usually a vertex or a fragment (pixel)). This generally enables a high degree of parallelism, in that a typical render output, e.g. frame, features a rather large number of vertices and fragments, each of which can be processed independently.

As is known in the art, a shader program to be executed by a given "shader" of a graphics processing pipeline will be provided by the application that requires the graphics processing using a high-level shader programming language, such as GLSL, HLSL, OpenCL, etc. This shader program will consist of "expressions" indicating desired programming steps defined in the relevant language standards (specifications). The high-level shader program is then translated by a shader language compiler to binary code for the target graphics processing pipeline. This binary code will consist of "instructions" which are specified in the instruction set specification for the given target graphics processing pipeline. The compilation process for converting the shader language expressions to binary code instructions may take place via a number of intermediate representations of the program within the compiler, as is known in the art. Thus the program written in the high-level shader language may be translated into a compiler specific intermediate representation (and there may be several successive intermediate representations within the compiler), with the final intermediate representation being translated into the binary code instructions for the target graphics processing pipeline.

A known way to improve shader execution efficiency is to group execution threads (where each thread corresponds to one vertex or one fragment (pixel)) into "groups" or "bundles" of threads, where the threads of one group are run in lockstep, one instruction at a time. This way, it is possible to share instruction fetch and scheduling resources between all the threads in the group. (Other terms used for such thread groups include "warps" and "wavefronts". For convenience the term thread group will be used herein, but this is intended to encompass all equivalent terms and arrangements, unless otherwise indicated.)

As is known in the art, execution threads execute sequences of program instructions. To facilitate this operation, it is necessary to keep track of which instruction in the sequence a thread is currently executing. To achieve this, as is known in the art, each thread normally has a program counter (PC) (also known as an instruction counter or an instruction pointer) associated with it which indicates the memory address of the instruction to be executed by the thread (and thereby where the thread is in its instruction sequence). (Thus instruction execution follows the flow: read instruction at address indicated by the program counter, execute the instruction and increment the program counter (and so on)).

Each program counter effectively points to the address in memory where the relevant instruction is stored, and thus may comprise, e.g., a 48-bit virtual address. The program counter for a thread is normally a binary counter that may be stored, e.g. in a register file and that is appropriately updated as instructions are executed, so as to point to the instruction that should be executed by the thread.

In normal operation, instructions executed by execution threads are first loaded into an instruction cache, from where they are then read by the thread and executed. Such an instruction cache will include, as is known in the art, plural cache lines, with each cache line including a number of fields, typically an address field indicating the address in main memory where the instructions in the cache line were read from, a valid bit indicating that the cache line contains valid data, and then a data field which stores the instructions themselves.

When an instruction is to be executed by a thread, the thread will determine if the instruction is present in the instruction cache. If the instruction is present in the instruction cache (there is a cache "hit"), the instruction can then be executed. If the instruction is not present in the instruction cache (there is cache "miss"), the thread is stalled until the relevant instruction is fetched into the cache.

FIGS. 1 and 2 show exemplary program counter storage 10 and an instruction cache 11 for an arrangement that can support the execution of n threads simultaneously. As shown in FIG. 1, there will be a separate program counter 12 for each thread in the program counter storage 10. FIG. 2 correspondingly shows the instruction cache 11, having n cache lines 13, each cache line storing, as discussed above, an address field 14, a valid bit 15 and data (the instructions) 16.

Graphics processors are usually highly multi-threaded. Each execution unit (shader) could, for example, have of the order of 128 active threads at any one time, with each of these threads having its own distinct program counter. This number of, e.g. 48-bit virtual address, program counters is too expensive to store in flip-flops and so the program counters are usually stored in a register file. Instruction execution by a graphics shader will accordingly then comprise reading the program counter from the program counter storage register file, performing an instruction cache match, doing an instruction cache read, executing the instruction, and then writing the updated program counter to the program counter storage register file. This all uses power.

The Applicants believe that there remains scope for improvements to the handling of instruction execution in data processing systems, and in particular for thread groups in graphics processing pipelines that include one or more shader stages.

BRIEF DESCRIPTION OF THE DRAWINGS

A number of embodiments of the technology described herein will now be described by way of example only and with reference to the accompanying drawings, in which:

FIG. 3 shows an exemplary computer graphics processing system;

FIG. 4 shows schematically a graphics processing pipeline that can be operated in the manner of the technology described herein.

Like reference numerals are used for like components where appropriate in the drawings.

DETAILED DESCRIPTION

Figure 1:
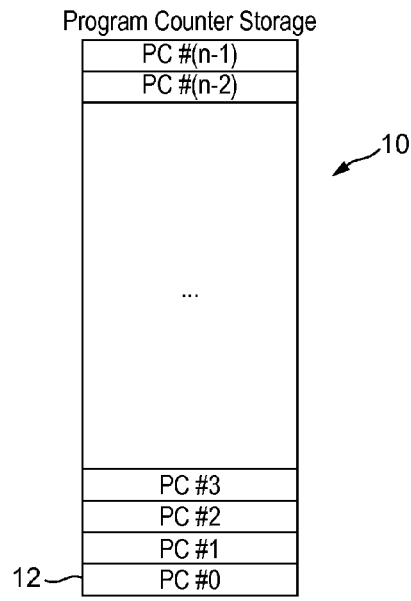
FIGS. 1 and 2 show conventional program counter and instruction cache arrangements.
Figure 2:
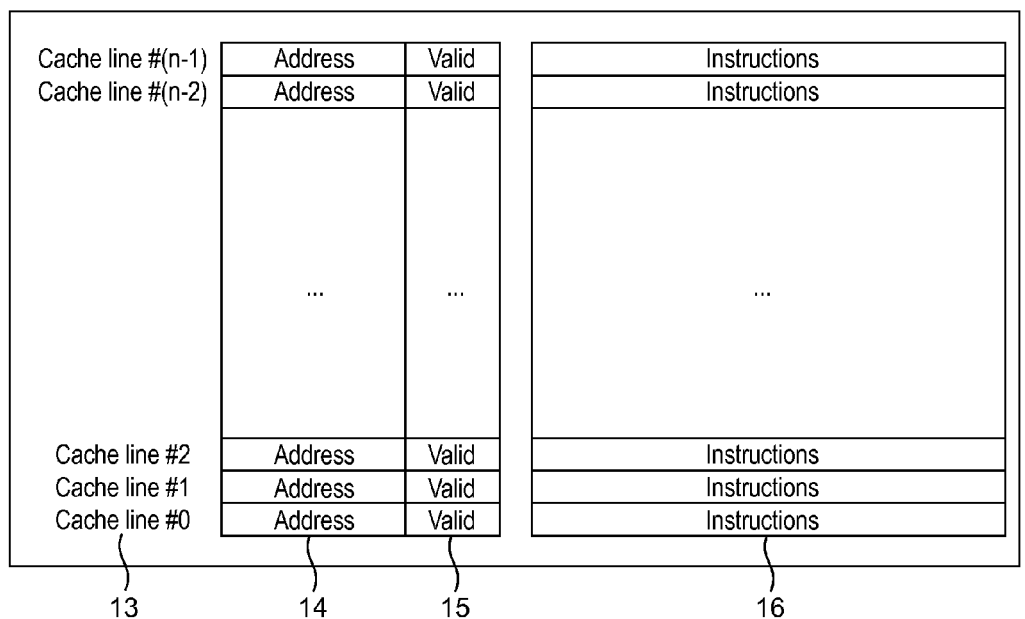

A first embodiment of the technology described herein comprises a method of operating a data processing system which includes an execution pipeline that includes one or more programmable execution stages which execute execution threads to execute instructions to perform data processing operations, and in which instructions to be executed for an execution thread are first fetched into an instruction cache and then read from the instruction cache for execution by a thread, the method comprising:

storing for a thread for which an instruction to be executed by the thread is present in a cache line in the instruction cache, or is to be fetched into an allocated cache line in the instruction cache, a pointer to the location of the instruction in the instruction cache;

using the stored pointer to the location in the instruction cache to retrieve the instruction to be executed by the thread from the instruction cache; and executing the instruction for the thread.

A second embodiment of the technology described herein comprises a data processing system comprising:

an execution pipeline that includes one or more programmable execution stages which execute execution threads to execute instructions to perform data processing operations; and an instruction cache into which instructions to be executed for an execution thread are fetched and then read from for execution by a thread; and wherein the data processing system:

stores for a thread for which an instruction to be executed by the thread is present in a cache line in the instruction cache, or is to be fetched into an allocated cache line in the instruction cache, a pointer to the location of the instruction in the instruction cache; and uses the stored pointer to the location in the instruction cache to retrieve the instruction to be executed by the thread from the instruction cache.

In the technology described herein, a pointer to the location of an instruction in the instruction cache is stored and used to retrieve an instruction to be executed for a thread. In other words, rather using a program counter that indicates the address in main memory where the instruction that the thread is to execute is stored, a pointer to the instruction in the instruction cache is used instead. This has the advantage that because the instruction cache is much smaller than the main memory where the instructions are stored, any pointer into the instruction cache can be much smaller than a full program counter. For example, for a 16 KB instruction cache, and 4-byte aligned instructions, a pointer to a cache line and an offset within the cache line would require only 12 bits to store, in contrast to the 48 bits that may be required for a full program counter.

This can then provide a significant reduction in the power consumption in the instruction fetch stage. For example, the pointers to the locations of instructions in the instruction cache used in the technology described herein could be stored in flip-flops, and in the common case, as will be discussed further below, only those pointers (flip-flops) may need to be updated when executing instructions for a thread or thread group. This would then save the program counter storage access cost (read plus write) plus the instruction cache match power cost when executing the instructions. (This would be at the cost of some extra area and complexity for supporting the operation in the manner of the technology described herein, but the Applicants believe that any extra area and complexity and any extra power consumption caused by that should still be considerably outweighed by the power savings achieved due to the technology described herein avoiding the program counter register file access and instruction cache match/lookup cost.)

It is believed that the technology described herein will have particular application in graphics processing systems. Thus the data processing system in an embodiment comprises a graphics processing system, the execution pipeline in an embodiment comprises a graphics processing pipeline, and the execution stages in an embodiment comprise one or more programmable graphics shading stages (shaders) which execute graphics shader programs to perform graphics processing operations. However, the technology described herein is equally applicable to other forms of data processing system, such as in CPUs.

It is also believed that the technology described herein will be particularly applicable to data, e.g. graphics, processing systems in which execution threads may be grouped together into thread groups, in which the threads of the group are executed in lock step, one instruction at a time. Thus, in an embodiment, the data processing system is a data processing system in which execution threads may be grouped together into thread groups, in which the threads of the group are executed in lock step, one instruction at a time.

The pointer to the location of the instruction in the instruction cache can be configured in any desired and suitable manner. In an embodiment it comprises a pointer to the relevant cache line in the instruction cache together with (an indication of) the offset within the cache line for the instruction in question. The pointers may be stored as desired, but are in an embodiment stored in flip-flops of or associated with the execution pipeline.

Any number of pointers to the instruction cache can be stored, as desired, e.g. depending on the number of active threads that the execution pipeline and/or execution stage can support, and the available or desired instruction cache pointer storage.

Where the execution pipeline/storage supports a given number of active threads, then there could be an instruction cache pointer for each active thread (e.g. for each thread in the set of active threads that the execution stage in question can support).

However, in an embodiment, pointers to the instruction cache are, in an embodiment only, maintained for respective thread groups (i.e. for groups of plural execution threads in which the threads of the group are to be executed in lock step, one instruction at a time). In this case, a pointer to the location of the instruction in the instruction cache for a thread will be stored by storing a pointer to the location of the instruction in the instruction cache for a thread group that the thread belongs to.

Thus, in an embodiment, a set of instruction cache pointers is maintained (stored), containing one pointer for each respective thread group that the active threads for the execution stage can be divided (organised) into. Thus, for example, in a graphics processing pipeline that supports up to 128 active threads at any one time, and thread groups comprising four threads, 32 "thread group" instruction cache pointers are in an embodiment stored.

In these arrangements, where there is a set of instruction cache pointers, then instruction cache pointers that do not store a valid link (reference) to an instruction in the instruction cache can in an embodiment be identified as, and marked as, being "invalid" (as not storing a valid instruction pointer).

As well as the instruction cache pointers, in an embodiment, a set of program counters for the threads is also maintained. This will then allow, e.g., the case where the threads in a thread groups diverge such that they no longer share a common program counter to be handled. Thus, in an embodiment, a set of program counters is maintained for a set of active threads in the data processing system (to indicate the memory locations of instructions for the active threads).

Thus in the above example, as well as the 32 instruction cache pointers for the thread groups, there are in an embodiment also 128 distinct program counters, one for each thread.

Where the execution threads may be grouped together into thread groups, and instruction cache pointers are maintained for respective thread groups, then in an embodiment respective program counters are correspondingly maintained for the respective thread groups (such that there is a program counter that is to be used in common for the threads in a thread group). In this case, there could, for example, be an additional set of "thread group" program counters, or it would be possible to use one of the program counters of an individual thread in the thread group as the program counter for the thread group as a whole, with, for example, the system also maintaining metadata, such as a bitmap, that maps the particular threads in the thread group to the individual thread program counter in question.

Thus, in the above example, as well as the 128 individual thread program counters, each group of four program counters is grouped together, to provide 32 "thread group" program counters.

The various program counters may be stored as defined, for example in register files in RAM of or accessible to the data processing system (execution pipeline).

The pointer(s) to the instruction cache can be generated in any desired and suitable manner. In an embodiment, the (and each) pointer is "generated" when an initial instruction cache lookup (test) for a thread (or thread group) based on the thread's (or thread group's) program counter is performed.

Thus, in an embodiment, the method of the technology described herein comprises, and the data processing system is configured to, when a thread or thread group is to execute or is executing a sequence of instructions:
  reading a program counter for the thread or thread group;
  performing an instruction cache lookup using the program counter value for the thread or thread group; and
  if there is a hit in the instruction cache, storing a pointer to the instruction in the instruction cache (in an embodiment in the form of a pointer to the cache line in the instruction cache together with the offset within the cache line for the instruction in question) for the thread or thread group; or
  if there is a miss in the instruction cache, but a cache line can be allocated for the thread or thread group, allocating a cache line in the instruction cache for the thread or thread group, and storing a pointer to the instruction in the instruction cache (in an embodiment in the form of a pointer to the allocated cache line in the instruction cache together with the offset within the cache line for the instruction in question) for the thread or thread group.

In an embodiment, if when the thread or thread group performs an instruction cache lookup based on the program counter, but then encounters a cache miss, and a cache line cannot be allocated at that time, the operation then falls back to the full program counter and normal program counter behaviour, in an embodiment with the pointer to an instruction location in the instruction cache that is associated with the thread or thread group in question then being marked as "invalid".

In an embodiment a cache line in the instruction cache is locked when a pointer to it has been stored for a thread or thread group (i.e. when a thread or thread group has a valid pointer to the cache line). The cache line can be locked in any desired and suitable manner, for example by incrementing a reference count for a cache line. In an embodiment, a full reference count is used per instruction cache line, so as to facilitate the possibility of many threads having pointers to the same cache line in the instruction cache.

Thus, in an embodiment, if there is a hit in the instruction cache, as well as storing a pointer to the instruction in the instruction cache, the line in the instruction cache (that is hit) is locked in respect of the thread or thread group in question.

Similarly, in an embodiment if there is a miss in the instruction cache, but a cache line can be allocated for the thread or thread group, as well as storing a pointer to the instruction in the instruction cache, the allocated cache line in the instruction cache is locked in respect of the thread or thread group in question.

Correspondingly, once a given thread or thread group reaches the end of or otherwise finishes with a cache line in the instruction cache, the cache line is in an embodiment unlocked in respect of that thread or thread group. Again, this can be done as desired, for example by decrementing a reference count for the cache line.

The stored pointers to the instructions in the instruction cache for the threads or thread groups are used to retrieve instructions from the instruction cache when they are to be executed.

In an embodiment, if the program flow continues in sequential order and the next instruction lies within the same cache line, then the instruction cache pointer for the thread or thread group is updated to indicate the new instruction in the cache line (e.g., to indicate the offset for the next instruction in the cache line), and that instruction is then executed, and so on, in an embodiment without updating any program counter for the thread or thread group, and in an embodiment without doing a cache match operation for each instruction fetch (this should not be necessary since it is already known where the instruction that is needed is in the instruction cache, and the instruction cache line has been locked.)

Similarly, for a relative branch instruction, if the branch offset is small enough to still be within the same line in the instruction cache, then again the pointer to the location of the instruction in the instruction cache can simply be, and is in an embodiment, updated to indicate the new instruction in the cache line (e.g. with the new offset within the cache line), again in an embodiment without updating any program counter for the thread or thread group, and in an embodiment without doing a cache match operation for each instruction fetch. This can allow many small loops and small if/else constructs to be handled without the need ever to read or update the full program counter.

The above arrangements allow the instruction cache pointers to be used instead of a full program counter for instructions to be executed that are within the same line in the instruction cache. However, it can be the case that, for example, a branch instruction will cross an instruction cache line boundary. In this case, in one embodiment the system then operates to retrieve the full program counter value, and then after that program counter value has been retrieved, to add the branch offset to the retrieved program counter, and to then perform a full instruction cache lookup/match process using the new program counter value (and then, e.g., to store a pointer to a new cache line that stores or will store the new instruction, and so on).

In this arrangement, the program counter value can be retrieved as desired, for example by reading it from the program counter storage register file and then replacing the offset within the cache line indicated by the program counter value with the cache line offset stored in the pointer for the thread group, or by reading the tag (address) of the instruction cache line that the instruction cache pointer is currently pointing to and then adding the cache line offset for the current instruction in that cache line. These arrangements for retrieving the "full" program counter value can also be used where an instruction actually needs to read the program counter itself.

In an embodiment, there is also stored for one or more of the cache lines in the instruction cache, and in an embodiment for each cache line in the instruction cache, an indication of where in the instruction cache (if anywhere) the instructions that immediately precede the instructions in the cache line and/or the instructions that immediately follow the instructions in the cache line (in the address space of the main memory where the instructions are stored) are stored (i.e. where in the instruction cache (if anywhere) the previous and next instruction cache line's worth of instructions are stored). In an embodiment each cache line in the instruction cache also has a "previous" and/or a "next" cache line pointer ("link") (and in an embodiment both a previous and a next cache line pointer) associated with it (stored for it) that indicate in which cache line in the instruction cache the previous and/or the next set of instructions (in sequential order) to the instructions stored in the current cache line are stored.

In an embodiment, each cache line in the instruction cache has associated with it (and in an embodiment contains) a "next cache line" and a "previous cache line" pointer (field) that is used to store this data. In this case, it is in an embodiment possible to mark in the "pointer" field that a pointer is invalid (i.e. that there is no valid link to another cache line). This can be done as desired, for example either by storing an explicit (invalid) flag, or, for example, by setting the operation such that a pointer that points to the cache line itself is invalid. The pointers in the instruction cache lines are in an embodiment configured as a doubly-linked list to facilitate pointer updating.

This arrangement can then allow instruction flow that crosses cache line boundaries to correspondingly be maintained and executed without any need to update the program counter or perform any cache tag test.

For example, in this arrangement, if the instruction flow crosses the current cache line boundary (e.g. due to its sequential flow, a branch instruction, or for any other reason), it is then checked whether the current cache line has a valid "next" or "previous" pointer (as appropriate), and if so, the cache line pointer associated with the thread or thread group in question is then updated to point to the appropriate new cache line. The instruction execution can then be continued using the cache line pointer for the thread or thread group in question, without the need to perform any program counter retrieval or operation. This will then allow, e.g., branches to the immediately preceding or immediately following cache line to be handled without the need to reconstruct the full program counter.

In an embodiment, it is first checked if the next instruction in the instruction flow would lie in the next and/or previous (e.g. depending on the direction of the instruction flow) cache line's worth of instructions, before then checking whether the current cache line has a valid "next" or "previous" pointer (as appropriate) (and then updating the cache line pointer and so on).

In these arrangements, when the instruction flow crosses a cache line boundary, such that a thread's or thread group's instruction cache line pointer is updated to a new cache line, then the previous cache line (the cache line being left) is in an embodiment unlocked for the thread or thread group in question (e.g. by having its reference count decremented), and the new cache line for the thread or thread group in question is in an embodiment locked (e.g. has its reference count incremented) for the thread or thread group in question.

If a cache line is evicted from the instruction cache, then the state of any cache lines that it is validly linked to should be, and in an embodiment is, updated in the instruction cache accordingly.

In these arrangements, if the current cache line does not have a valid pointer (link) to another cache line, then in an embodiment, the program counter value for the thread or thread group in question is retrieved, in an embodiment by reading the instruction cache tag of the current cache line and adding the length of the current cache line. That program counter value is in an embodiment then used for an instruction cache lookup. In response to this lookup, if there is a cache hit, then the instruction execution in an embodiment continues into the appropriate next cache line immediately.

If there is a cache miss, with a cache line available for allocation, then in an embodiment a line in the instruction cache is immediately allocated to the thread or thread group in question, the current cache line and the new allocated cache line are in an embodiment linked together, the thread's or thread group's cache line pointer is in an embodiment updated to point to the newly allocated line, and the thread's or thread group's execution is stalled until the new cache line is filled (the system waits for the new cache line to become valid).

If there is a cache miss, but with no cache lines currently available for allocation, then the reconstructed program counter values are in an embodiment stored back to the program counter register file and the thread is then stalled until a new cache line becomes available for allocation.

As well as in the above situation where a cache line does not have a valid subsequent cache line pointer, it may also be necessary to retrieve and store the full program counter value to the program counter register file in the situation where there is, for example, a divergent branch. In this case, the appropriate cache line pointers may be followed for one branch, but not for the other, and for that other branch, the full program counter should be, and in an embodiment is, recreated for the threads that follow that other branch.

It is believed that the idea of including pointers to cache lines that contain the previous and next sets of instructions in an instruction cache may be new and advantageous in its own right.

Thus, another embodiment of the technology described herein comprises a method of operating a data processing system which includes an execution pipeline that includes one or more programmable execution stages which execute execution threads to execute instructions to perform data processing operations, and in which instructions to be executed for an execution thread are first fetched into an instruction cache and then read from the instruction cache for execution by a thread, the method comprising:

storing in the instruction cache for one or more of the cache lines in the instruction cache an indication of where in the instruction cache the instructions that immediately precede the instructions in the cache line and/or the instructions that immediately follow the instructions in the cache line are stored.

Another embodiment of the technology described herein comprises a data processing system comprising:

an execution pipeline that includes one or more programmable execution stages which execute execution threads to execute instructions to perform data processing operations; and an instruction cache into which instructions to be executed for an execution thread are fetched and then read from for execution by a thread; and in which:

the instruction caches stores for one or more of the cache lines in the instruction cache an indication of where in the instruction cache the instructions that immediately precede the instructions in the cache line and/or the instructions that immediately follow the instructions in the cache line are stored.

As will be appreciated by those skilled in the art, these embodiments of the technology described herein can and in an embodiment do include any one or more or all of the optional features of the technology described herein, as appropriate.

Thus, for example, the stored indications of where in the instruction cache the instructions that immediately precede the instructions in the cache line and/or the instructions that immediately follow the instructions in the cache line are stored are in an embodiment used to retrieve an instruction to be executed by a thread or thread group from the instruction cache when the instruction flow (sequence) for the thread or thread group crosses an instruction cache line boundary. Similarly, the lines in the instruction cache are in an embodiment locked and unlocked as appropriate as the instruction flow for a thread or thread group crosses instruction cache line boundaries.

The instruction sequence for an execution stage of the execution pipeline will, as is known in the art, normally be, and is in an embodiment provided by a compiler for the execution pipeline. Thus, in the case of a graphics processing system, the shader compiler for the graphics processing pipeline in an embodiment performs this operation. The compiler may, e.g., run on a host processor of the data processing system that includes the execution pipeline (with the execution pipeline then being on another processor, such as a graphics processor that is associated with the host processor (such that the compiler and compiled code all run on separate processors within the overall data processing system, e.g. graphics processing system)). However, other arrangements would be possible, such as a compiler running on the same processor as the compiled code, or the compiler being run on a separate processor, such as the program being pre-compiled on a separate system and being distributed in a compiled form.

The instruction sequence from the compiler will be stored in main memory for the execution pipeline. Then, as discussed above, the instructions will be loaded from that main memory into the instruction cache as they are required for execution by threads. The main memory can comprise any memory of the data processing system that is suitable for this purpose. The instruction cache can comprise any suitable cache of or accessible to the data processing system.

The execution stages (units) of the data processing pipeline can comprise any suitable such stages. In the case of a graphics processing pipeline, the execution units (stages) in an embodiment comprise programmable, shading stages of the graphics processing pipeline such as the vertex shader, fragment shader, etc. These stages can be implemented as desired and in any suitable manner, and can perform any desired and suitable shading, e.g. vertex shading, fragment shading, etc., functions, respectively and as appropriate. In the case of a fragment shader, for example, the fragment shader may render a primitive or primitives to generate a set of render output values, e.g. representing a frame for display. These output values may then be exported to external memory for storage and use, such as to a frame buffer for a display.

In an embodiment all the execution stages (each execution stage) of the execution pipeline can and do operate in the manner of the technology described herein.

Each programmable processing stage (execution unit) may comprise any suitable programmable hardware element such as programmable processing circuitry. Each programmable processing stage may be provided as a separate circuit element to other programmable stages of the processing pipeline or the programmable processing stages may share some or all of their programmable processing circuitry (that is then differently programmed to serve as the desired programmable processing stage).

As well as the programmable processing (shader) stages, the graphics processing pipeline may also contain any other suitable and desired processing stages that a graphics processing pipeline may contain such as a rasteriser, an early depth (or an early depth and stencil) tester, a late depth (or depth and stencil) tester, a blender, a tile buffer, a write out unit, etc.

The technology described herein can be used for all forms of output that a graphics processing pipeline may be used to generate, such as frames for display, render-to-texture outputs, etc. The output, e.g. fragment shaded, data values from the graphics processing are in an embodiment exported to external, e.g. main, memory, for storage and use, such as to a frame buffer for a display.

The technology described herein is applicable to any suitable form or configuration of graphics processor. It is particularly applicable to tile-based graphics processors and graphics processing systems. Thus in an embodiment, the graphics processing system and graphics processing pipeline are a tile-based system and pipeline, respectively.

In some embodiments, the processing system comprises, and/or is in communication with, one or more memories and/or memory devices that store the data described herein and/or store software for performing the processes described herein. The processing system may also be in communication with a host microprocessor, with a graphics processor for processing the data described herein, and/or with a display for displaying images based on the data described herein.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the data processing system and pipeline can otherwise include any one or more or all of the usual functional units, etc., that data processing pipelines include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. Thus further embodiments of the technology described herein comprise computer software specifically adapted to carry out the methods herein described when installed on a data processor, a computer program element comprising computer software code portions for performing the methods herein described when the program element is run on a data processor, and a computer program comprising software code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk It will further be appreciated that not all steps of the methods of the technology described herein need be carried out by computer software and thus further broad embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD-ROM, ROM, RAM, flash memory, or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display.

FIG. 3 shows a typical computer graphics processing system.

An application 2, such as a game, executing on a host processor 1 will require graphics processing operations to be performed by an associated graphics processing unit (graphics processing pipeline) 3. To do this, the application will generate API (Application Programming Interface) calls that are interpreted by a driver 4 for the graphics process pipeline 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

FIG. 4 shows the graphics processing pipeline 3 of the present embodiment in more detail.

The graphics processing pipeline 3 shown in FIG. 4 is a tile-based renderer and will thus, as is known in the art, produce tiles of a render output data array, such as an output frame to be generated.

(As is known in the art, in tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may, as is known in the art, typically be an output frame intended for display on a display device, such as a screen or printer, but may also, for example, comprise intermediate data intended for use in later rendering passes (also known as a "render to texture" output), etc.

(As is known in the art, when a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.)

FIG. 4 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 4. It should also be noted here that FIG. 4 is only schematic, and that, for example, in practice the shown functional units and pipeline stages may share significant hardware circuits, even though they are shown schematically as separate stages in FIG. 4. It will also be appreciated that each of the stages, elements and units, etc., of the graphics processing pipeline as shown in FIG. 4 may be implemented as desired and will accordingly comprise, e.g., appropriate circuitry and/or processing logic, etc., for performing the necessary operation and functions.

As shown in FIG. 4, the graphics processing pipeline 3 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20, as is known in the art, takes the input data values associated with the vertices, etc., defined for the output to be generated, and processes those data values to generate a set of corresponding "vertex shaded" output data values for use by subsequent stages of the graphics processing pipeline 3. The vertex shading, for example, modifies the input data to take account of the effect of lighting in the image to be rendered.

As is known in the art, the hull shader 21 performs operations on sets of patch control points and generates additional data known as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 3.

The rasterisation stage 25 of the graphics processing pipeline 3 operates, as is known in the art, to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs, is known in the art, a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data, as is known in the art.

This fragment processing may include any suitable and desired fragment shading processes, such as executing fragment shader programs on the fragments, applying textures to the fragments, applying fogging or other operations to the fragments, etc., to generate the appropriate fragment data, as is known in the art. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by, as is known in the art, comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z-buffer within the tile buffer 30. (The tile buffer will store, as is known in the art, colour and depth buffers that store an appropriate colour, etc., or Z-value, respectively, for each sampling point that the buffers represent (in essence for each sampling point of a tile that is being processed).) These buffers store, as is known in the art, an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). (The display device could comprise, e.g., a display comprising an array of pixels, such as a computer monitor or a printer.)

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 3 would, of course, be possible.

The above describes certain features of the operation of the graphics processing system shown in FIG. 3. Further features of the operation of the graphics processing system shown in FIG. 3 in accordance with embodiments of the technology described herein will now be described.

As can be seen from FIG. 4, the graphics processing pipeline 3 includes a number of programmable processing or "shader" stages, namely the verbex shader 20, hull shader 21, domain shader 23, geometry shader 24, and the fragment shader 27. These programmable shader stages execute respective shader programs that have one or more input variables and generate sets of output variables and that are provided by the application. To do this, the application 2 provides the shader programs implemented using a high-level shader programming language, such as GLSL, HLSL, OpenCL, etc. These shader programs are then translated by a shader language compiler to binary code for the target graphics processing pipeline 3. This may include, as is known in the art, the creation of one or more intermediate representations of the program within the compiler. (The compiler may, e.g., be part of the driver 4, with there being a special API call to cause the compiler to run. The compiler execution can thus be seen as being part of the draw call preparation done by the driver in response to API calls generated by an application).

As discussed above, each shader in the graphics processing pipeline is a processing unit that performs graphics processing by running small programs for each graphics item in a graphics output to be generated (an "item" in this regard is usually a vertex, a fragment or a pixel). To do this, the shader will execute a set of execution threads (where each thread corresponds to one graphics item). Each thread will execute a sequence of instructions corresponding to the shader program in question. As discussed above, to facilitate this operation, the progress of each thread through the instruction sequence is monitored. The present embodiments relate to techniques for performing such monitoring, particularly in the situation where execution threads to be executed by a shader have been organised into a "group" or "bundle" of threads that are to be run in lockstep, one instruction at a time (although this is not essential and the techniques of the technology described herein can equally be used where the threads are not organised into such thread groups, if desired).

In the present embodiment, to monitor the progress of threads through a sequence of instructions to be executed, a program counter (as discussed above) is maintained and stored for each thread (an individual program counter is needed for each thread to handle the (relatively uncommon) case where the threads diverge and no longer share a common program counter). These program counters are stored, e.g. in a register file in RAM of or accessible to the graphics processing pipeline.

As well as individual program counters for each thread, a program counter is maintained for each respective thread group. Thus, for example, for a graphics processor capable of having 128 threads active at any one time, and supporting 4-thread thread groups, there will also be 32 thread group program counters (one for each group of 4 threads). This means that when processing thread groups there will only be 32 program counters to keep track of in the common case. These thread group program counter values may be stored in flip-flops for example.

As well as the above program counters, the present embodiments also store for each respective thread group, a pointer (a link) to the cache line in the instruction cache that contains (or that will contain) the instruction they are to execute (and are executing, while the instruction is being executed). As will be discussed further below, this then means that a thread can progress through the instruction sequence without the need necessarily to use and update the full program counters for the thread and/or thread group.

Figure 5:
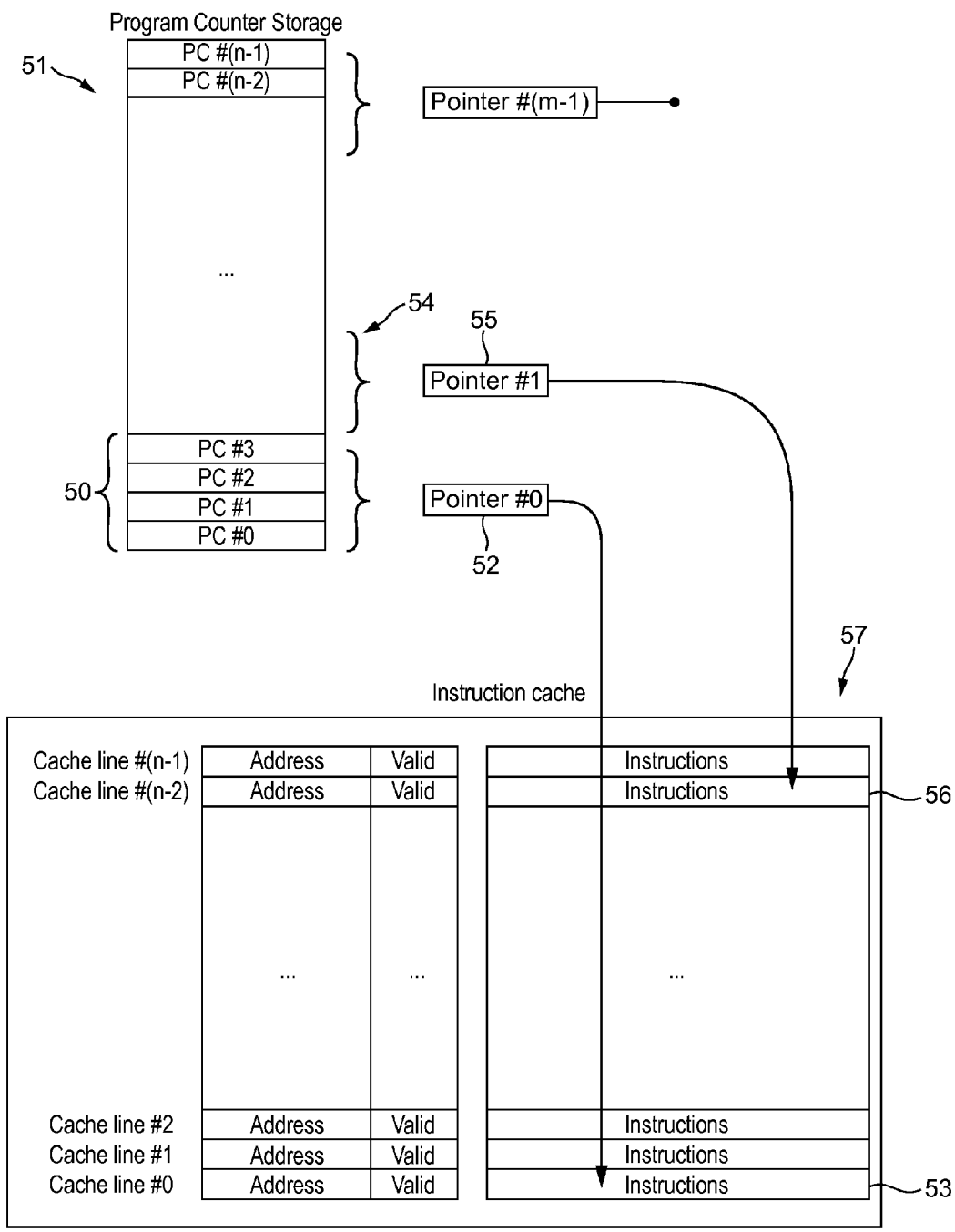
FIGS. 5 to 11 illustrate the operation of embodiments of the technology described herein.

FIG. 5 shows schematically this arrangement of storing pointers to cache lines in the instruction cache so as to link thread groups to their respective "lines" in the instruction cache 57. As shown in FIG. 5, for a first thread group 50 consisting of threads 0, 1, 2, 3 (each having respective program counters in the program counter storage 51), a pointer 52 to the cache line 53 that contains the current instructions for that thread group is stored. Similarly, for a second thread group 54, a pointer 55 to the cache line 56 in the instruction cache 57 containing the instructions for that thread group is correspondingly stored.

To generate the instruction cache line pointers for each thread group, the full program counter for the thread group is read and an instruction cache lookup is performed. This operation, and any cache miss handling, is performed in the conventional manner. However, if there is a cache hit, or when a cache line is allocated to the thread group, the cache line is locked in the instruction cache for the thread group, and a pointer to the cache line and the offset within the cache line is stored for the thread group instead of a full program counter value.

For a 16 KB instruction cache, and 4-byte aligned instructions, each instruction cache line pointer will require only 12 bits instead of the 48 required for a full program counter value. Thus for 32 thread groups (as discussed above), 32 12-bit pointers will be required. This can be stored in flip-flops of or associated with the graphics processing pipeline.

Figure 6:
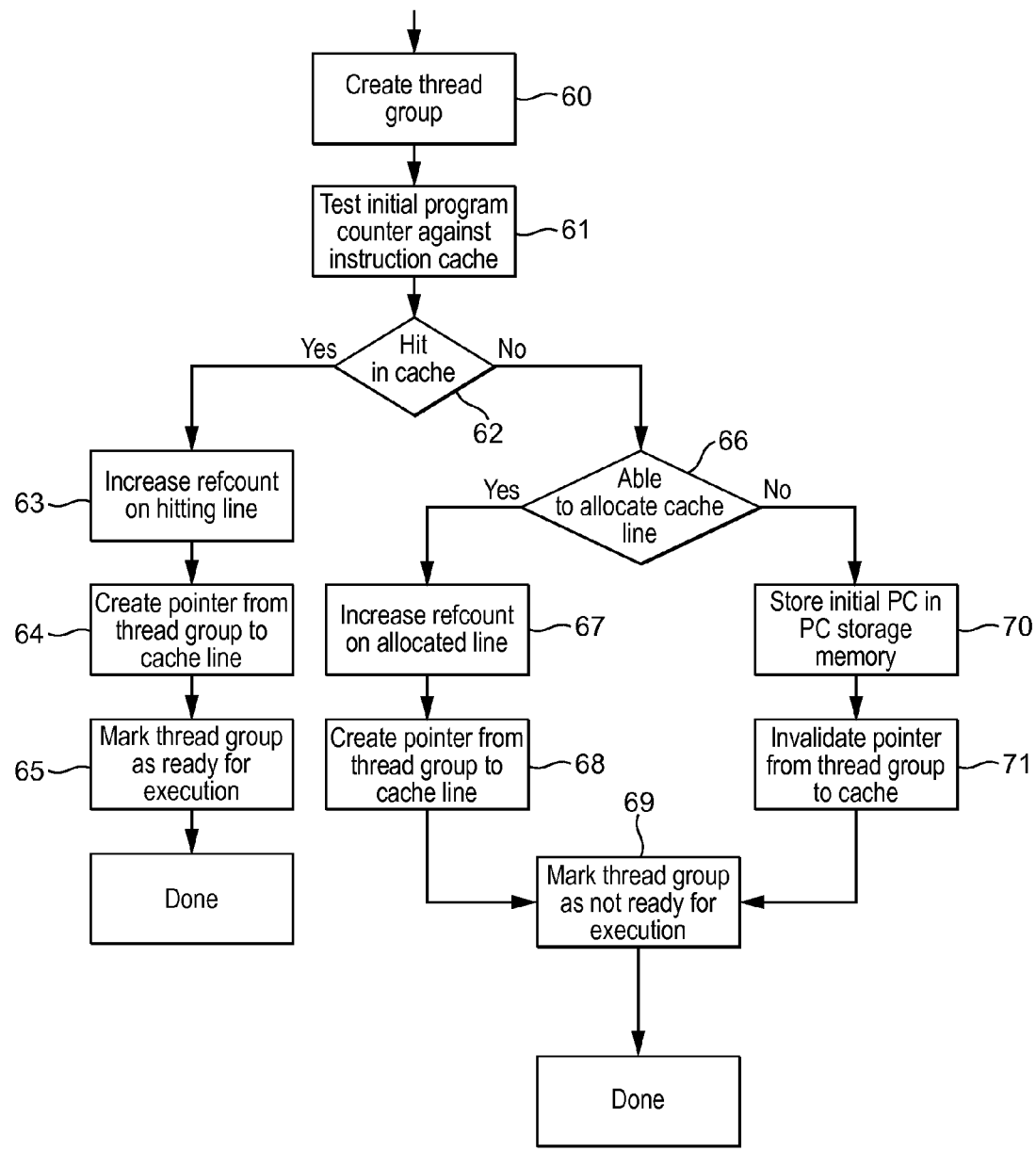

FIG. 6 illustrates this process of creating thread groups and linking the thread groups to cache lines in the instruction cache 57. As shown in FIG. 6, when a thread group is created (step 60), the program counter for the thread group is first tested against the instruction cache (step 61). If there is a hit in the cache (step 62), the "hit" cache line is locked by increasing the reference counter for that cache line (step 63), a pointer for the thread group to the relevant cache line in the instruction cache is stored (step 64), and the thread group is then marked as being ready for execution (step 65) (since the instructions for the thread group are present in the instruction cache).

On the other hand, if in step 62 there is not a hit in the instruction cache, then it is first determined whether there is a free cache line that can be allocated to the thread group (step 66). If there is an available cache line, then the cache line is allocated and locked (step 67) and a pointer from the thread group to the allocated cache line is stored (step 68). The thread group is then marked as not being ready for execution (step 69) (because the relevant instructions for the thread group still need to be fetched into the instruction cache).

If there is no available cache line at step 66, then the initial program counter for the thread group is stored in the program counter storage memory (step 70), and the corresponding instruction cache pointer for the thread group is marked as being invalid (step 71). The thread group is then again marked as not being ready for execution (step 69).

Figure 7:
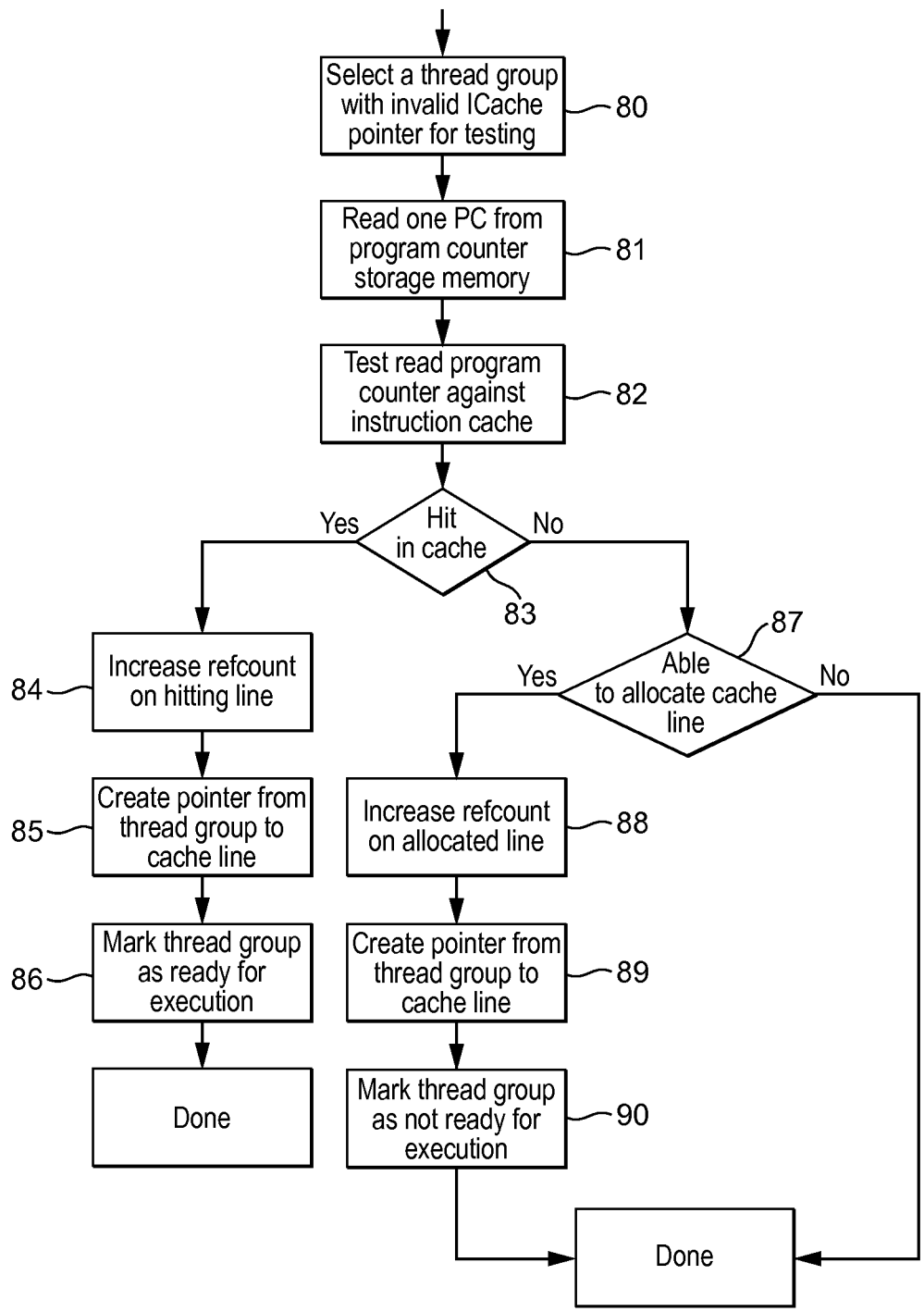

FIG. 7 shows the corresponding operation for creating pointers (links) to the instruction cache for thread groups that have been created but which do not currently have a valid instruction cache pointer (link). As shown in FIG. 7, a thread group with an invalid instruction cache pointer is selected for testing (step 80), one program counter for the thread group is read from the program counter storage (step 81), and then the read program counter value is tested against the instruction cache (step 82) to see if the relevant instructions for that program counter are present in the instruction cache.

If there is a hit in the instruction cache (step 83), the "hit" cache line is locked by increasing the reference counter for that cache line (step 84), a pointer for the thread group to the relevant cache line in the instruction cache is stored (step 85), and the thread group is then marked as being ready for execution (step 86).

On the other hand, if in step 83 there is not a hit in the instruction cache, then it is first determined whether there is a free cache line that can be allocated to the thread group (step 87). If there is an available cache line, then the cache line is allocated and locked (step 88) and the pointer from the thread group to the allocated cache line is stored (step 89). The thread group is then marked as not being ready for execution (step 90).

If there is no available cache line at step 87, then the state for the thread group is not changed, and the thread group will accordingly be tried again later.

In the present embodiment, a full reference count is used for locking and unlocking each cache line, as there may be multiple thread groups linked to (pointing to) any given cache line.

These processes are repeated for each respective thread group.

Figure 8:
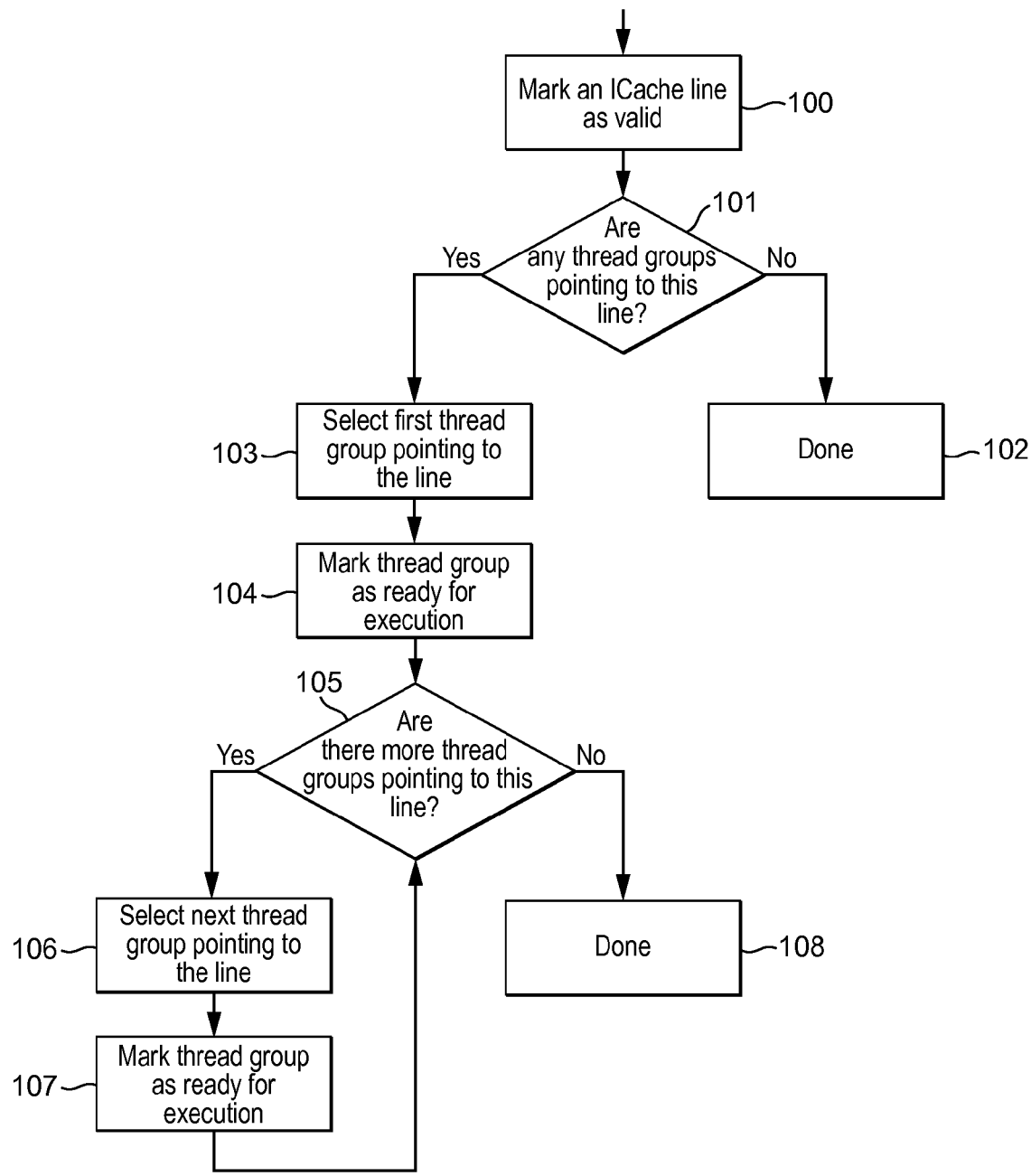

FIG. 8 shows the operation when an instruction cache line becomes valid (i.e. the relevant instruction data is loaded into the instruction cache line from main memory). As shown in FIG. 8, the process starts when an instruction cache line is marked as valid (step 100). It is then determined whether there are any thread groups which have been linked to the newly valid instruction cache line (that point to the newly valid instruction cache line) (step 101). If there are no thread groups pointing to the newly valid instruction cache line, then the process stops at that point (step 102).

On the other hand, if there are thread groups whose pointers point to the newly valid instruction cache line, then the first thread group pointing to the line is selected (step 103) and that thread group is then marked as ready for execution (step 104). This process is then repeated for each other thread group that is pointing to the cache line, until all the thread groups pointing to the cache line have been marked as ready for execution (steps 105, 106, 107 and 108).

The instruction cache line pointers are then used when executing instructions for the thread group, instead of the full program counter (where that is possible). For example, if the program flow continues in sequential order, and does not cross a cache line boundary, the pointer offset within the cache line is simply updated, and there is no need to do a cache match operation for each new instruction fetch, since the pointer indicates where in the cache the data that is needed is (and the cache line has been locked). Thus, in the common case only the instruction cache pointers may need updating, thereby saving on the program counter storage access cost (read+write) plus the instruction cache match power cost.

Furthermore, for a relative branch instruction where the offset is small enough to still be within the same cache line, then again only the stored pointer to the instruction cache needs to be updated. This will allow many small loops and small if/else constructs to be handled without ever reading or updating the full program counter.

In this embodiment, if a branch instruction crosses a cache line boundary (or an instruction actually needs to read the program counter), then the program counter for the thread group is retrieved. This is done in one of two ways, either by reading it from the program counter storage register file and then replacing the offset within the cache line indicated by the program counter value with the cache line offset stored in the pointer for the thread group, or by reading the cache tag for the currently linked cache line from the instruction cache and then adding the cache line offset stored in the pointer for the thread group (as the address tag for the current cache line (which gives the memory address for the start of the cache line) plus the offset within the line will correspond to the correct current program counter for the thread group).

After the program counter has been retrieved, the branch offset is added, and then a full instruction lookup/match is performed again.

Figure 9:
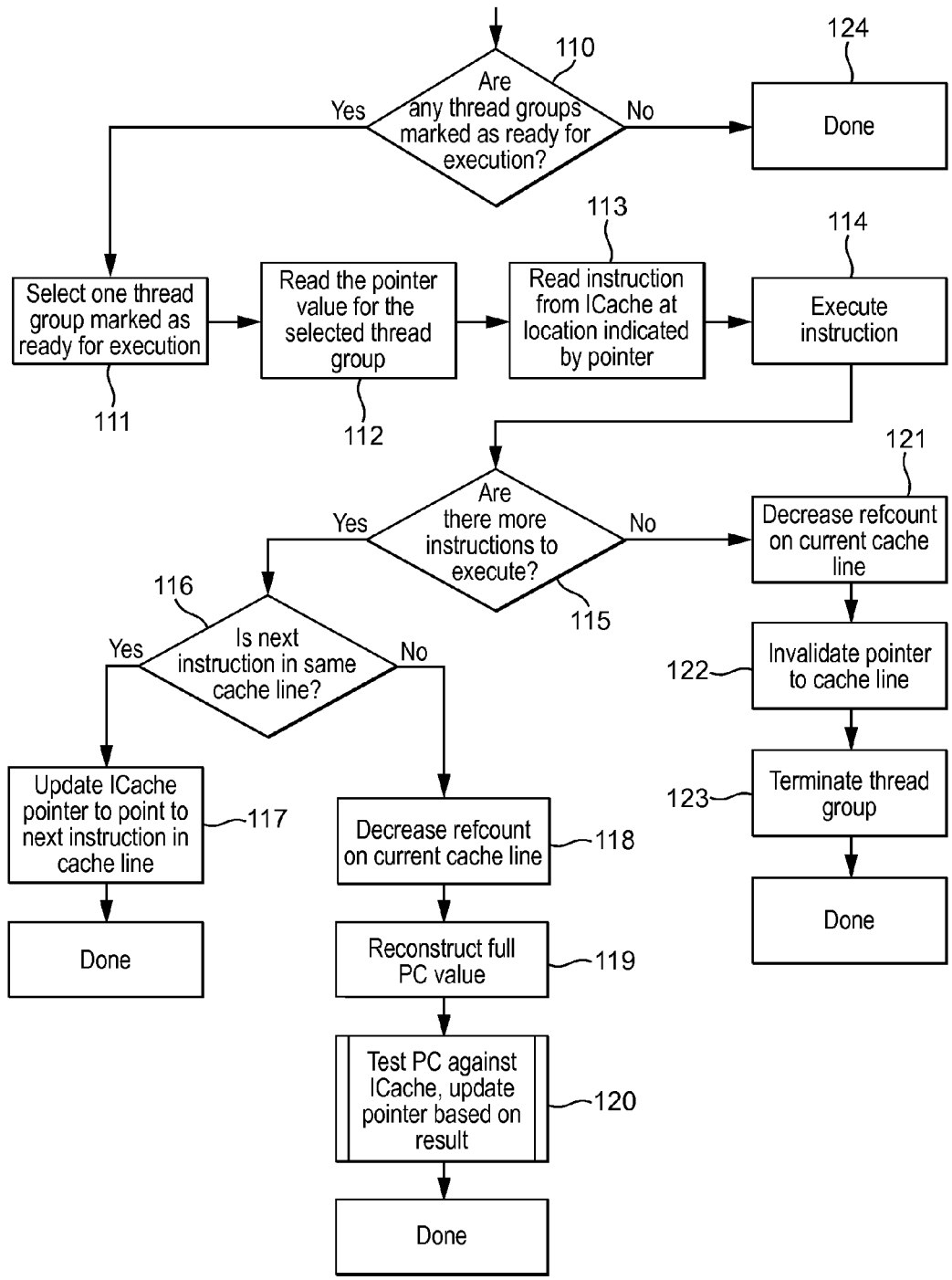

FIG. 9 shows this process for executing a thread group in the present embodiment.

As shown in FIG. 9, it is first determined whether there are any thread groups marked as ready for execution (step 110). If there are no thread groups marked as ready for execution, then the process is terminated (step 124).

If there are thread groups marked as ready for execution, then one thread group marked as ready for execution is selected (step 111), the instruction cache line pointer for the selected thread group is read (step 112), and the instruction in the instruction cache at the location pointed to by the pointer is read (step 113), and the instruction then executed for the thread group (step 114).

It is then determined whether there are any more instructions to execute for the thread group (step 115). If there are more instructions to execute for the thread group, it is then determined whether the next instruction for the thread group is in the same cache line (step 116). If so, the instruction cache pointer for the thread group is updated to point to the next instruction in the cache line (step 117).

On the other hand, if the next instruction is not in the same cache line, then the reference count on the current cache line is decreased (step 118) to "unlock" the cache line in respect of the thread group in question, the full program counter value is reconstructed (step 119), and the reconstructed program counter value is then tested against the instruction cache, and the instruction cache pointer for the thread group updated based on the result of the test (step 120).

If it is determined at step 115 that there are no more instructions to execute for the thread group, then the reference count for the current cache line is decreased so as to "unlock" the cache line in respect of the thread group being executed (step 121), the thread group's instruction cache line pointer is marked as invalid (step 122), and the processing for the thread group is terminated (step 123).

This process is repeated for each respective thread group, as appropriate.

Figure 10:
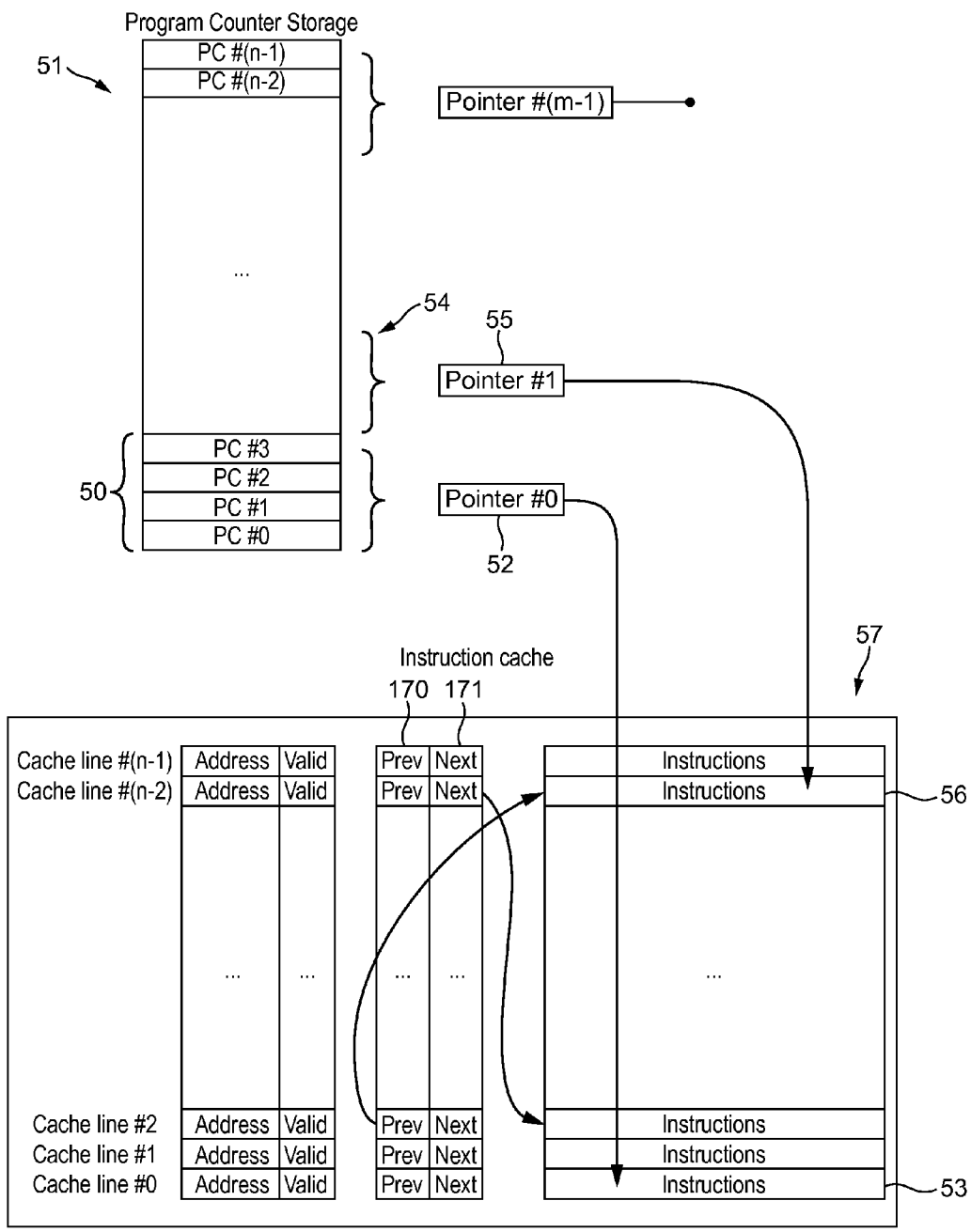
Figure 11:
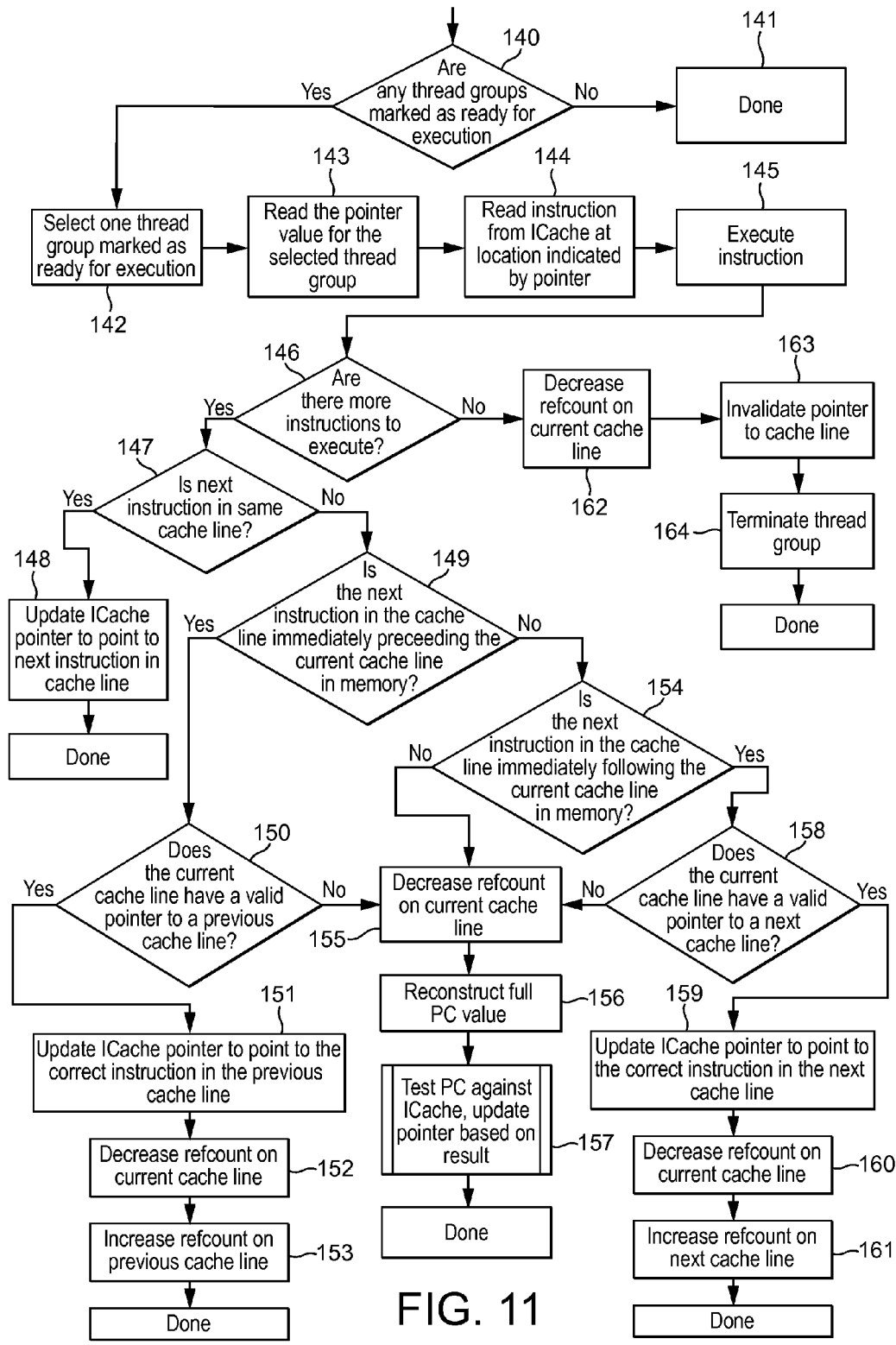

FIGS. 10 and 11 illustrate another embodiment of the technology described herein in which the embodiment described above is extended by also using pointers to link together cache lines in the instruction cache. In this embodiment for each cache line a "previous" and a "next" pointer (link) is stored, indicating where in the instruction cache, if anywhere, the instructions that come before and after the instructions in the cache line are stored (where the previous and next cache line's worth of instructions are stored).

For example, for an exemplary memory composed of fixed-size "words" and a cache with 1-word cache lines, where cache line 1 contains a cached copy of word #20, cache line 7 contains word #21, and word #22 is not currently being stored anywhere in the cache, then in this case, the "next" pointer of cache line 1 should point to line 7, the "previous" pointer of cache line 7 should point to cache line 1, and the "next" pointer of cache line 7 should be marked as invalid (marking a pointer as invalid can be done, e.g., by either storing an explicit flag bit, or by applying a rule that a pointer that points to itself is invalid—under such a rule, the "next" pointer of cache line 7 would be set to point to cache line 7):

| Cache Line | Content | Next | Previous |
| --- | --- | --- | --- |
| 1 | Word #20 | 7 | 1 (invalid) |
| 7 | Word #21 | 7 (invalid) | 1 |

FIG. 10 illustrates such an arrangement where each cache line in the instruction cache also contain previous and next pointers 170, 171 to other lines in the instruction cache. Thus, as shown in FIG. 10, each cache line in the instruction cache 57, as well as containing the memory address, a valid bit and the relevant instructions, also includes a previous field 170 and a next field 171 which are used to point to the cache lines in the instruction cache containing the previous and next, respectively instructions in the instruction sequence for the cache line in question. The cache lines are linked as a doubly linked list.

In this embodiment, if a sequential instruction flow crosses a cache line boundary, it is then checked whether the current cache line has a valid "next" pointer. If it does, the thread group's cache line pointer is updated to point to that "next" cache line, and the thread group's execution then continued. This is done entirely without having to update the program counter or perform any cache tag tests for the thread group.

When the sequential instruction flow crosses a cache line boundary in this manner, the cache line it leaves is unlocked (has its refcount decremented), and the cache line it enters is locked (has its refcount incremented).

If the cache line doesn't have a valid "next" pointer, then the program counter for the thread group is retrieved by reading the instruction cache tag of the current cache line and adding the length of the current cache line (as it cannot be read from the program counter storage register file, since that is not being updated). This program counter is then used for an instruction cache lookup. This has three possible outcomes:

i) Cache hit: the next line is present in the instruction cache. In this case, execution can continue into the next cache line immediately.

ii) Cache miss, with a line available for allocation. In this case, a cache line is immediately allocated, and the current cache line and the new allocated cache line are linked together, the thread group's execution is stalled until the new cache line is filled, and the thread group's cache line pointer is updated to point to the newly allocated cache line. The thread group then waits for the cache line to become valid.

iii) Cache miss, but with no cache lines available for allocation. In this case, the program counter for the thread group is stored back to the program counter register file, and the thread group waits until a cache line becomes available for allocation (in the absence of branches, this will be the only time that the program counter actually needs to be stored to the program counter register file).

In this embodiment, when evicting a cache line with valid next/previous pointers (links), the state of the linked lines is updated as well.

This embodiment can allow all cases of sequential code execution to be handled without needing the full program count, as long as the cache is hit. It can also handle all relative branches that hit the current or any directly adjacent cache line (using the "next" or "previous" pointers as appropriate). The Applicants believe this is likely to cover a very large percentage of instruction fetches in a GPU. Indeed the Applicants believe that for most current shaders, at least once the instruction cache has been "primed" (e.g., one graphics item, e.g. pixel, has been processed so as to fill the instruction cache), it should be possible to do an instruction cache match/lookup operation when a thread group is first created, and then never again use or update the full program counter for the lifetime of the thread group.

FIG. 11 shows schematically the execution of a thread group where the instruction cache includes previous and next cache line pointers.

FIG. 11 shows the process for executing a thread group in this embodiment of the technology described herein.

As shown in FIG. 11, it is first determined whether there are any thread groups marked as ready for execution (step 140). If there are no thread groups marked as ready for execution, then the process is terminated (step 141).

If there are thread groups marked as ready for execution, then one thread group marked as ready for execution is selected (step 142), the instruction cache line pointer for the selected thread group is read (step 143), and the instruction in the instruction cache at the location pointed to by the pointer is read (step 144) and the instruction then executed for the thread group (step 145).

It is then determined whether there are any more instructions to execute for the thread group (step 146). If it is determined that there are no more instructions to execute for the thread group, then the reference count for the current cache line is decreased so as to "unlock" the cache line in respect of the thread group being executed (step 162), the thread group's instruction cache line pointer is marked as invalid (step 163) and the processing for the thread group is terminated (step 164).

On the other hand, if it is determined at step 146 that there are more instructions to execute for the thread group, it is then determined whether the next instruction for the thread group is in the same cache line (step 147). If so, the instruction cache pointer for the thread group is updated to point to the next instruction in the cache line (step 148).

If at step 147 it is found that the next instruction is not in the same cache line, it is then determined whether the next instruction would be in the cache line that stores the set of instructions that are at the immediately lower (main memory) address to the instructions in the current cache line (if present in the instruction cache) (step 149) (i.e. it is determined whether the next instruction is in the cache line immediately preceding the current cache line in memory (i.e. whether the next instruction would be in the cache line that would be pointed to by the previous cache line pointer for the current cache line (if it has a valid previous cache line pointer))). If yes, it is then determined whether the current cache line has a valid pointer to a previous cache line (step 150). If yes, the instruction cache pointer for the thread group in question is updated to point to the correct instruction of the indicated previous cache line (step 151), the reference count on the current instruction cache line is decreased so as to unlock that line in respect of the thread group (step 152), and the reference count on the indicated previous cache line is incremented so as to lock that previous cache line for the thread group (step 153).

On the other hand, if it is determined at step 149 that the next instruction would not be in the cache line that stores the set of instructions that are at the immediately lower (main memory) address to the instructions in the current cache line, it is then determined whether the next instruction in the instruction flow would be in the cache line that stores the set of instructions that are at the immediately higher (main memory) address to the instructions in the current cache line (if present in the instruction cache) (i.e. it is determined whether the next instruction is in the cache line immediately following the current cache line in memory (i.e. whether the next instruction would be in the cache line that would be pointed to by the next cache line pointer for the current cache line)) (step 154).

If yes, it is then determined whether the current cache line has a valid pointer to a next cache line (step 158). If yes, the instruction cache pointer for the thread group in question is updated to point to the correct instruction of the indicated next cache line (step 159), the reference count on the current instruction cache line is decreased so as to unlock that line in respect of the thread group (step 160), and the reference count on the indicated next cache line is incremented so as to lock that next cache line for the thread group (step 161).

If it is determined at step 154 that the next instruction would not be in the cache line that stores the set of instructions that are at the immediately higher (main memory) address to the instructions in the current cache line, or it is determined at step 158 that the current cache line does not have a valid pointer to a next cache line, or it is determined at step 150 that the current cache line does not have a valid pointer to a previous cache line, then the reference count on the current cache line is decreased (step 155) to "unlock" the cache line in respect of the thread group in question, the full program counter value is reconstructed (step 156), and the reconstructed program counter value is then tested against the instruction cache, and the instruction cache pointer for the thread group updated based on the result of the test (step 157).

The above process is repeated for each respective thread group.

It can be seen from the above that the technology described herein, in its embodiments at least, provides a mechanism for handling sequential code (instruction) execution without the need to use or necessarily maintain a full program counter, at least as long as the execution hits in the instruction cache. The Applicants believe this is likely to cover a very large percentage of instruction fetches in a GPU, such that for most current shaders it may be possible to do an instruction cache match/lookup operation when a thread group is first created, and then never again use or update the full program counter for the lifetime of the thread group.

This is achieved, in the embodiments of the technology described herein at least, by storing pointers into the instruction cache for thread groups, and using those pointers to access the instruction cache, rather than full program counter values.

The foregoing detailed description has been presented for the purposes of illustration and description. It is not intended to be exhaustive or to limit the invention to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing system which includes an execution pipeline that includes one or more programmable execution stages which execute execution threads to execute instructions to perform data processing operations, and in which instructions to be executed for an execution thread are first fetched into an instruction cache and then read from the instruction cache for execution by a thread, the method comprising:
   storing in the instruction cache for one or more of the cache lines in the instruction cache an indication of where in the instruction cache the instructions that immediately precede the instructions in the cache line and the instructions that immediately follow the instructions in the cache line are stored;
   storing for a thread for which an instruction to be executed by the thread is present in a cache line in the instruction cache, or is to be fetched into an allocated cache line in the instruction cache, a pointer to the location of the instruction in the instruction cache;
   using the stored pointer to the location of the instruction in the instruction cache to retrieve the instruction to be executed by the thread from the instruction cache; and
   executing the instruction for the thread;
   the method further comprising locking a cache line in the instruction cache when a pointer to the cache line has been stored for a thread or thread group.

2. A data processing system comprising:
   an execution pipeline that includes one or more programmable execution stages which execute execution threads to execute instructions to perform data processing operations; and
   an instruction cache into which instructions to be executed for an execution thread are fetched and then read from for execution by a thread; and in which:
   the instruction caches stores for one or more of the cache lines in the instruction cache an indication of where in the instruction cache the instructions that immediately precede the instructions in the cache line and the instructions that immediately follow the instructions in the cache line are stored;
   wherein the data processing system:
   stores for a thread for which an instruction to be executed by the thread is present in a cache line in the instruction cache, or is to be fetched into an allocated cache line in the instruction cache, a pointer to the location of the instruction in the instruction cache; and uses the stored pointer to the location of the instruction in the instruction cache to retrieve the instruction to be executed by the thread from the instruction cache; and wherein the data processing system is configured to lock a cache line in the instruction cache when a pointer to the cache line has been stored for a thread or thread group.

3. A computer readable storage medium storing computer software code which when executing on a processor performs a method of operating a data processing system which includes an execution pipeline that includes one or more programmable execution stages which execute execution threads to execute instructions to perform data processing operations, and in which instructions to be executed for an execution thread are first fetched into an instruction cache and then read from the instruction cache for execution by a thread, the method comprising:

storing in the instruction cache for one or more of the cache lines in the instruction cache an indication of where in the instruction cache the instructions that immediately precede the instructions in the cache line and the instructions that immediately follow the instructions in the cache line are stored;

storing for a thread for which an instruction to be executed by the thread is present in a cache line in the instruction cache, or is to be fetched into an allocated cache line in the instruction cache, a pointer to the location of the instruction in the instruction cache;

using the stored pointer to the location of the instruction in the instruction cache to retrieve the instruction to be executed by the thread from the instruction cache; and executing the instruction for the thread;

the method further comprising locking a cache line in the instruction cache when a pointer to the cache line has been stored for a thread or thread group.

4. The method of claim 1, further comprising, if following the execution of an instruction by a thread or thread group, the next instruction in the program flow lies within the same cache line in the instruction cache:

updating the instruction cache pointer for the thread or thread group to indicate the new instruction in the cache line;

using the updated pointer to retrieve the next instruction to be executed by the thread or thread group from the instruction cache; and executing the instruction for the thread or thread group.

5. The method of claim 1, further comprising, if the instruction flow crosses the current cache line's boundary:

checking whether the current cache line has a valid indication of where in the instruction cache the instructions that immediately precede the instructions in the cache line or the instructions that immediately follow the instructions in the cache line are stored as appropriate, and if so, updating the cache line pointer associated with the thread or thread group in question to point to the appropriate new cache line; and using the updated cache line pointer for the thread or thread group to continue the instruction execution.

6. The method of claim 5, further comprising when the instruction flow crosses a cache line boundary:

unlocking the previous cache line in respect of the thread or thread group in question, and locking the new cache line for the thread or thread group in question.

7. The method of claim 1, wherein the data processing system is a data processing system in which execution threads may be grouped together into thread groups, in which the threads of the group are executed in lock step, one instruction at a time, and further comprising:

storing an instruction cache pointer for each respective thread group that the active threads for an execution stage are divided into.

8. The method of claim 1, further comprising storing a set of program counters for a set of active threads in the data processing system.

9. The method of claim 1, wherein the data processing system is a data processing system in which execution threads may be grouped together into thread groups, in which the threads of the group are executed in lock step, one instruction at a time, and further comprising:

storing a program counter for each respective thread group that the active threads for an execution stage are divided into.

10. The method of claim 1, further comprising, when a thread or thread group is to execute or is executing a sequence of instructions:

reading a program counter for the thread or thread group;

performing an instruction cache lookup using the program counter value for the thread or thread group; and if there is a hit in the instruction cache, storing a pointer to the instruction in the instruction cache for the thread or thread group; or if there is a miss in the instruction cache, but a cache line can be allocated for the thread or thread group, allocating a cache line in the instruction cache for the thread or thread group, and storing a pointer to the instruction in the instruction cache for the thread or thread group.

11. The method of claim 1, wherein the data processing system comprises a graphics processing system that includes a graphics processing pipeline that includes one or more programmable shader stages which execute graphics shader programs to perform graphics processing operations.

12. The system of claim 2, wherein the data processing system is configured to, if following the execution of an instruction by a thread or thread group, the next instruction in the program flow lies within the same cache line in the instruction cache:

update the instruction cache pointer for the thread or thread group to indicate the new instruction in the cache line;

use the updated pointer to retrieve the next instruction to be executed by the thread or thread group from the instruction cache; and execute the instruction for the thread or thread group.

13. The system of claim 2, wherein the data processing system is configured to, if the instruction flow crosses the current cache line boundary:

check whether the current cache line has a valid indication of where in the instruction cache the instructions that immediately precede the instructions in the cache line or the instructions that immediately follow the instructions in the cache line are stored, as appropriate, and if so, update the cache line pointer associated with the thread or thread group in question to point to the appropriate new cache line; and use the updated cache line pointer for the thread or thread group to continue the instruction execution.

14. The system of claim 13, wherein the data processing system is configured to, when the instruction flow crosses a cache line boundary:

unlock the previous cache line in respect of the thread or thread group in question, and lock the new cache line for the thread or thread group in question.

15. The system of claim 2, wherein the data processing system is a data processing system in which execution threads may be grouped together into thread groups, in which the threads of the group are executed in lock step, one instruction at a time; and wherein:
    an instruction cache pointer is stored for each respective thread group that the active threads for an execution stage are divided into.

16. The system of claim 2, wherein a set of program counters for a set of active threads in the data processing system is also stored.

17. The system of claim 2, wherein the data processing system is a data processing system in which execution threads may be grouped together into thread groups, in which the threads of the group are executed in lock step, one instruction at a time; and wherein
    a program counter for each respective thread group that the active threads for an execution stage are divided into is also stored.

18. The system of claim 2, wherein the data processing system is configured to, when a thread or thread group is to execute or is executing a sequence of instructions:
    read a program counter for the thread or thread group;
    perform an instruction cache lookup using the program counter value for the thread or thread group; and
    if there is a hit in the instruction cache, store a pointer to the instruction in the instruction cache for the thread or thread group; or
    if there is a miss in the instruction cache, but a cache line can be allocated for the thread or thread group, allocate a cache line in the instruction cache for the thread or thread group, and store a pointer to the instruction in the instruction cache for the thread or thread group.

19. The system of claim 2, wherein the data processing system comprises a graphics processing system that includes a graphics processing pipeline that includes one or more programmable shader stages which execute graphics shader programs to perform graphics processing operations.

\* \* \* \* \*